United States Patent [19]
Genouille

[11] Patent Number: 5,775,287
[45] Date of Patent: Jul. 7, 1998

[54] CONNECTING ROD FOR AN INTERNAL COMBUSTION ENGINE

[75] Inventor: Michel Genouille, Verrieres Le Buisson, France

[73] Assignee: Ascometal, Puteaux, France

[21] Appl. No.: 800,625

[22] Filed: Feb. 14, 1997

[30] Foreign Application Priority Data

Feb. 16, 1996 [FR] France .................................. 96 01916

[51] Int. Cl.⁶ ...................................................... F02B 75/28
[52] U.S. Cl. .......................................................... 123/197.3
[58] Field of Search ............................ 123/197.3, 197.4; 74/579 E, 579 R, 579 F, 585

[56] References Cited

U.S. PATENT DOCUMENTS

| | | |
|---|---|---|
| 1,514,306 | 11/1924 | Sheffield, Jr. . |
| 4,836,045 | 6/1989 | Lobig ................................. 123/197.3 |
| 5,560,333 | 10/1996 | Genouille ........................... 123/197.3 |

FOREIGN PATENT DOCUMENTS

| | | |
|---|---|---|
| 0598664 | 5/1994 | European Pat. Off. . |
| 3719112 | 12/1988 | Germany . |

*Primary Examiner*—Marguerite McMahon
*Attorney, Agent, or Firm*—Oblon, Spivak, McClelland, Maier & Neustadt, P.C.

[57] ABSTRACT

A connecting rod for an internal combustion engine includes a body, a first end and a second end which is larger than the first end. This forms two bearings at the first and second ends, and each receives a piston shaft and a crank shaft pin. The connecting rod is comprised of two parts, approximately symmetrical with respect to a longitudinal median plane of the connecting rods. Their joint surface is essentially arranged in the median plane. The parts each carry a half-bearing of the first end and a half-bearing of the second end, and they are connected to one another by at least one immobilization device. The connecting rod is characterized in that the immobilization device, located outside the connecting rod on the side of the first end of the connecting rod and outside the axis of a piston, is comprised of an articulation whose elements, identical on each part of the connecting rod, will extend beyond the plane defined by the joint surface and will have a thickness approximately equal to half the thickness of the connecting rod. The elements are installed opposite one another and the friction surfaces of the articulation are arranged perpendicular to the longitudinal axis of the connecting rod bearing. The elements of each of the two parts are held together by an assembly device.

4 Claims, 3 Drawing Sheets

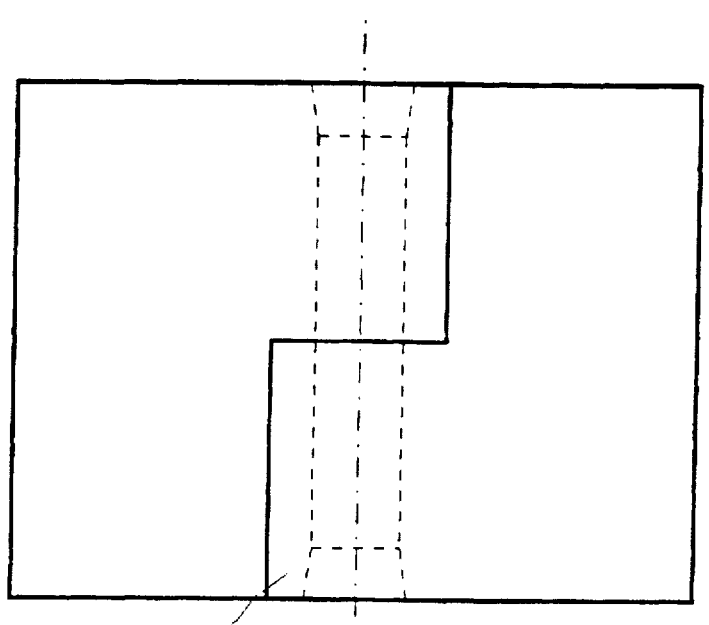
Fig. 3c
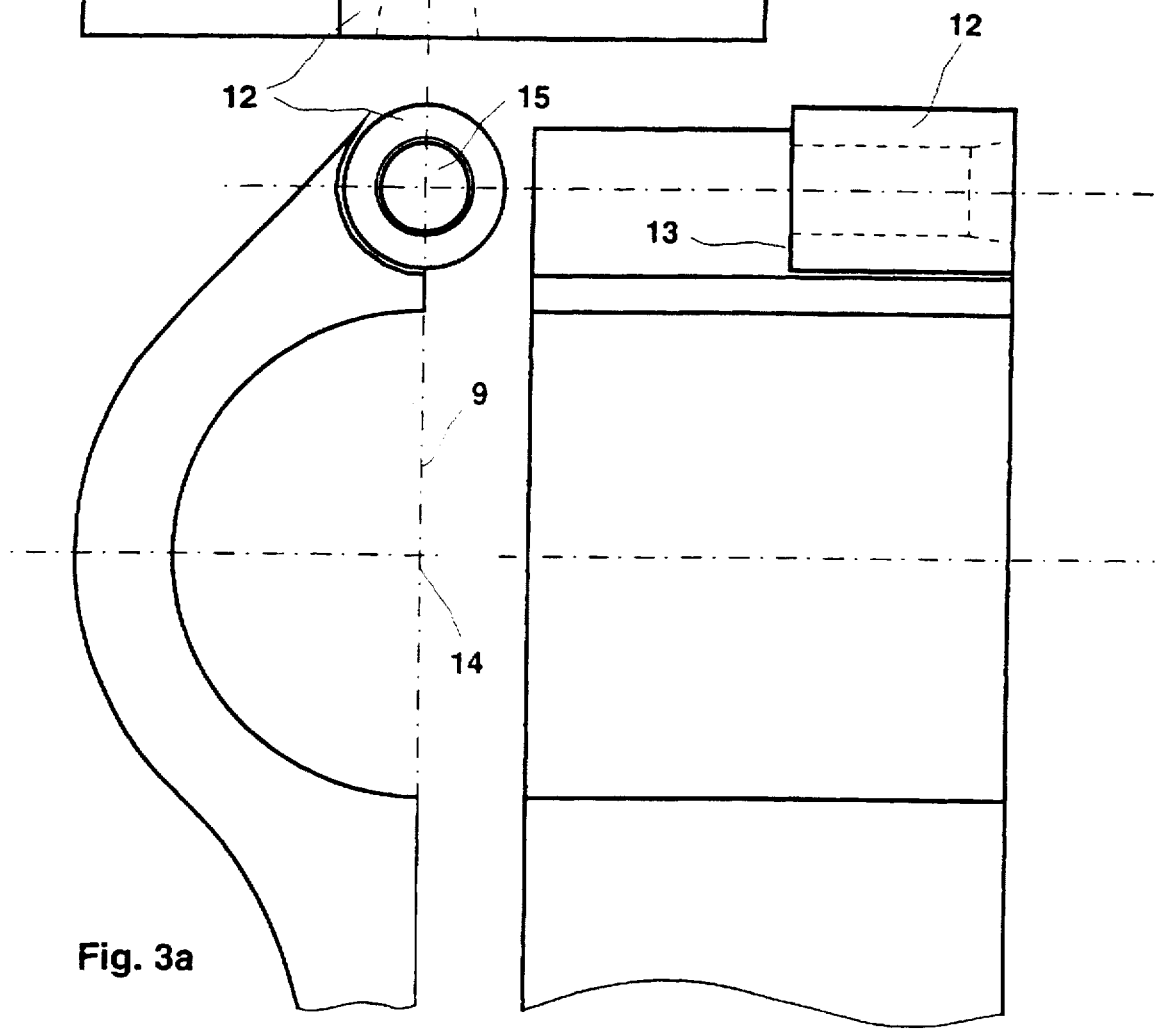
Fig. 3a
Fig. 3b

CONNECTING ROD FOR AN INTERNAL COMBUSTION ENGINE

BACKGROUND OF THE INVENTION

FIELD OF THE INVENTION

The present invention relates to a connecting rod, particularly for an internal combustion engine, that includes a body, a first small end, and a second end which is larger than the first end. This forms two bearings at the small and big ends, and each receives a piston shaft and a crank shaft pin. The connecting rod is comprised of two parts, approximately symmetrical with respect to a longitudinal median plane of the connecting rods. Their joint surface is essentially arranged in the median plane. The parts each carry a half-bearing of the small end and a half-bearing of the large end, and they are connected to one another by at least one means of immobilization.

DISCUSSION OF THE BACKGROUND

In the application of French Patent No. 9,213,859, a connecting rod is disclosed that includes a body, a small end of the connecting rod, and a large end of the connecting rod which form cylindrical bearings. They are to be provided to a shaft of a piston and a crank shaft pin. The connecting rod is comprised of two forged parts connected along a joint surface and locked to one another by means of immobilization. The two parts, each including two half-bearings, are approximately symmetrical with respect to a longitudinal median plane of the connecting rod. The joint surface is essentially arranged in the longitudinal median plane. At least one immobilization component is located on the body of the connecting rod between the large end and small end of the connecting rod.

In the aforementioned document, two disconnected parts are presented at least at one of their ends, the small end part of the connecting rod and/or the large end part of the connecting rod. Because of their separation, they have a degree or rotation freedom, with respect to one another, around the axis of the piston, or again, around the small end of the connecting rod/and or of the crank pin, or even of the axis of the large end of the connecting rod.

Preferably the small end of the connecting rod is crescent-shaped or takes the shape of an open ring. This releases one part of the surface o the piston shaft reducing the length of the connecting rod and the distance between the shaft of the piston and the bottom of the piston.

This design of the connecting rod's small end has the disadvantage of not localizing the forces of contact between, in particular, the connecting rod and the piston shaft in a relatively angular sector which is far from the median plane of symmetry of the connecting rod. Consequently, these contact forces, which are standard to the piston shaft and to the cylindrical cylinder bore of the small end of the connecting rod, cause perpendicular forces in the median plane of symmetry. This causes an opening by bending each half-bearing of the connecting rod. This deformation, although very small, will cause miniature displacements between the piston shaft and half-bearings of the connecting rod, leading to degradation of the piston shaft due to the so-called "fretting" phenomenon which negatively affects good performance of the shaft and generates a lot of noise.

In order to avoid deformation, which causes an opening by bending each half-bearing of the connecting rod, it is possible to increase the masses of the half-bearing. However, the increase of the mass works against the desired goal, which is to reduce the masses and movement of the motor as much as possible.

SUMMARY OF THE INVENTION

An object of the invention is to provide a forged connecting rod, particularly of an internal combustion engine, which will have a degree of freedom of angular rotation of one part of the connecting rod, with respect to the other part of the connecting rod, around the axis. This allows a separation of the half-bearings of the large end of the connecting rod to achieve installable and detachable connection of the connecting rod to the crank shaft pin.

A further object of the present invention is to provide a forged connecting rod in which the means of immobilization located at the end of the connecting rod, on the side of the small end of the connecting rod, is comprised of an articulation whose components, identical on each half-connecting rod, extend beyond the plane defined by the joint surface. They also have a thickness that is approximately equal to half the thickness of the connecting rod and each component is placed facing each other. Friction surfaces are arranged perpendicular to the longitudinal axes of the bearings of the connecting rod. The components of each of the two parts of the connecting rod are held together by an assembly means.

The connecting rod of the present invention also includes an assembly means comprised of a shaft which goes through a component perpendicular to the surfaces of seats, forming an articulation shaft. The articulation shaft is selected from among a lynch pin, a bolt, and small pin.

The present invention therefore provides for a forged connecting rod which comprises a body, a first end, and a second end which is larger than the first end, such that first and second bearings are formed at the first and second ends. Each of the bearings can receive a piston shaft and a crank shaft pin. The connecting rod may be comprised of first and second parts which are approximately symmetrical with respect to a longitudinal median plane of the connecting rod. A joint surface of the first and second parts is essentially arranged in the median plane, with the first and second parts each carrying a half-bearing at the first end and a half-bearing at the second end. The first and second parts are connected to one another by at least one immobilization means which is located outside of the connecting rod on a side of the first end of the connecting rod and outside of an axis of the piston.

The immobilization means comprises an articulation having elements which are identical on each of the first and second parts of the connecting rod. The elements extend beyond a plane defined by the joint surface and have a thickness approximately equal to half a thickness of the connecting rod. Seats of the elements are opposite one another, and friction surfaces of the articulation are arranged perpendicular to a longitudinal axis of the connecting rod bearings. The elements of each of the first and second parts are held together by an assembly means.

The present invention also provides for a forged connecting rod for an internal combustion engine which comprises a body that includes first and second parts that are approximately symmetrical with respect to a longitudinal median plane of the connecting rod. The body includes a first end and a second end which is larger than the first end. The connecting rod further includes an immobilization means for connecting the first and second parts to each other. The immobilization means is positioned in a vicinity of the first end of the connecting rod and comprises an articulation means.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected, and it is to be understood that each specific element can include technical equivalents which operate for a similar purpose.

A more complete appreciation of the invention and many of the attendant advantages thereof will be readily obtained as the same becomes better understood by reference to the following detailed description when considered in connection with the accompanying drawings, wherein:

FIG. 3a, 3b, 3c show one part of the connecting rod in the example of implementation in accordance with the present invention.

DESCRIPTION OF THE PREFERRED EMBODIMENTS

Figure 1:
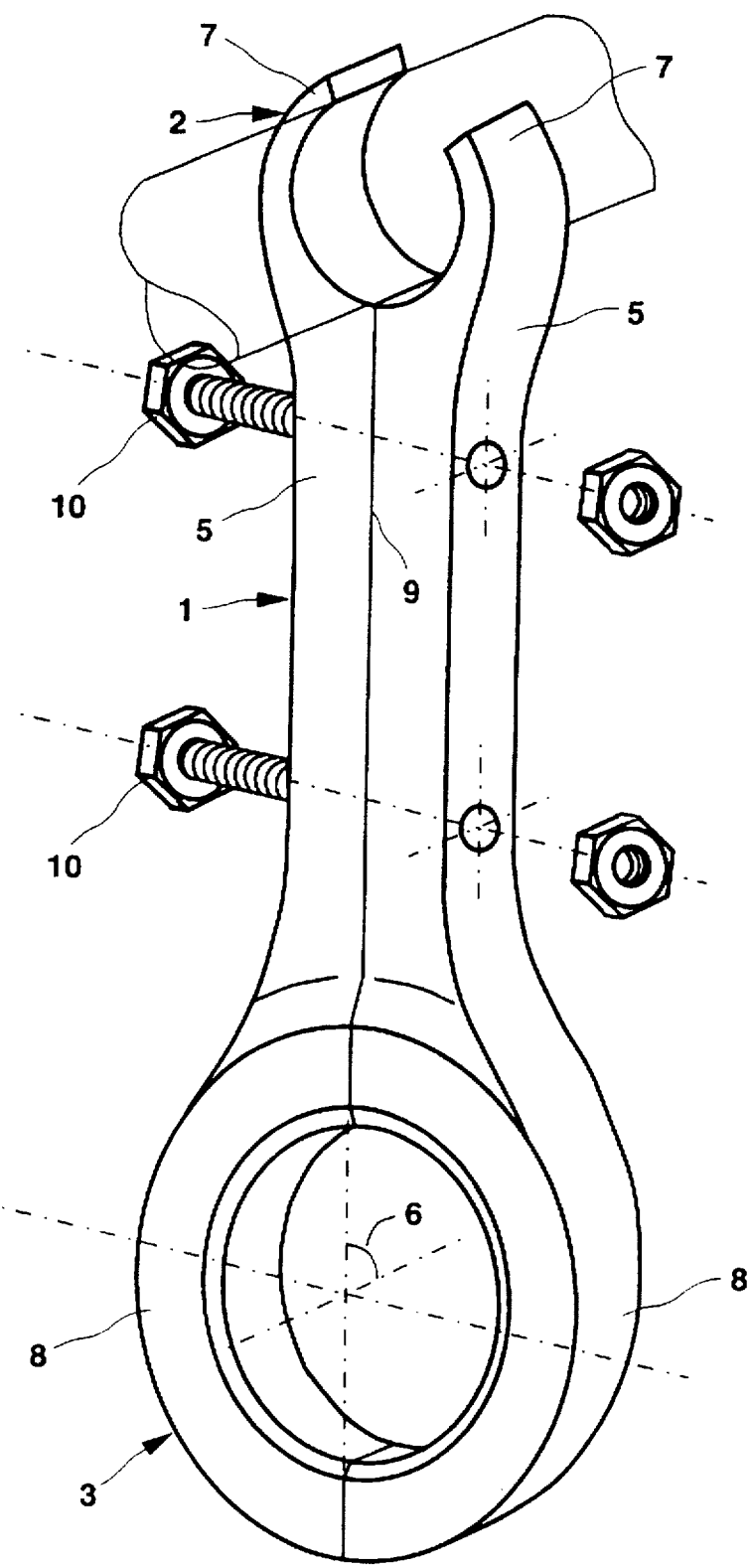
FIG. 1 is a general perspective view of the connecting rod of the related art.

Referring now to the drawings, wherein like reference numerals designate identical or corresponding parts throughout the several views, FIG. 1 shows a connecting rod of the related art, especially of an internal combustion engine which includes a body 1, a small end 2 of the connecting rod, and a large end 3 of the connecting rod which form bearings that are each intended to receive one cylindrical piston shaft 4 presented in thin lines on the figure, or a crank shaft pin not shown in the figures. The connecting rod is comprised of two parts 5, which are symmetrical with respect to a longitudinal medium plane 6 of the connecting rod. The parts 5 each include a half-bearing 7, 8 at their ends.

The joint surface 9 of the two parts 5 is essentially arranged in the median plane 6. The parts 5 are connected to one another by a means of immobilization provided on body 1 of the connecting rod between the small end 2 and the large end 3 of the connecting rod. In this example of implementation, the means of immobilization is comprised of two bolts 10.

During operation, the connecting rod of the related art causes contact forces between half-bearing 7 of the connecting rod and the piston shaft 4. These contact forces are localized in one angular sector on both sides of the plane of symmetry, in a zone of the shaft, the farthest from the body 1. These typical contact forces on the cylindrical surface of the cylindrical bore of the bearing will cause perpendicular component forces in the median plane 6. This will cause separation by deformation and bending of each of the half-bearings 7 of the connecting rod.

Although very minor, this deformation will cause miniature displacements between the piston shaft and the bearing. This will allow surface degradations known as "fretting" which is harmful to the piston shaft's performance and generates noise.

In order to avoid this deformation, various devices have been devised such as that of introducing a key, lengthwise, for example, which connects the half-bearing 7 of the small end of the connecting rod, perpendicular to the median plane of the connecting rod. It is inserted in the notches made at the end of the bearings in order to be supported on the external sides of the half-bearings. This key, very short for reasons of convenience, and the bottom of the piston have very low elasticity and require machining with extremely precise tolerances whose cost can outweigh the economic advantage of this solution. In addition, the key's non-tolerance will induce constraints which are prohibitive. Furthermore, the installation of this key in an automobile is nearly impossible.

Figure 2:
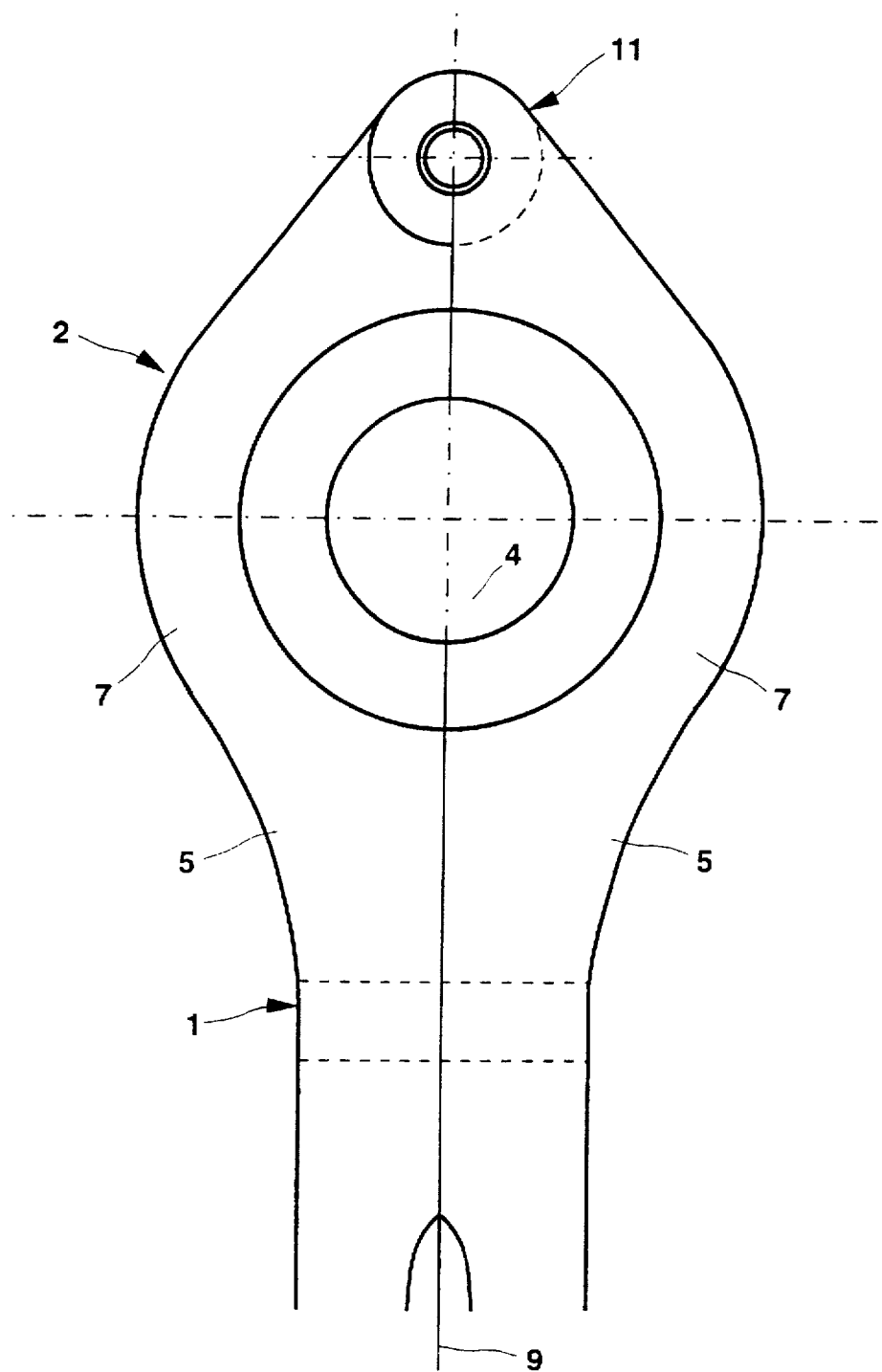
FIG. 2 shows, in frontal view, a small end of the connecting rod and one example of implementation in accordance with the present invention.

FIG. 2, in one example of implementation of the present invention, presents one end of the connecting rod and, in particular, the small end 2 of the connecting rod having a body 1. The small end 2 of the connecting rod forms a bearing intended to receive a piston shaft 4.

The connecting rod is comprised of two parts 5, symmetrical with respect to the median plane 6 of the connecting rod. The parts 5 include two half-bearings 7.

According to this invention, the means of immobilization, placed at the end of the connecting rod on the side of the small end 2 of the connecting rod and outside the piston shaft 4, is comprised of an articulation 11 whose elements 12, identical on each part 5 of the connecting rod, extend beyond the plane defined by the joint surface as illustrated in FIGS. 3a, 3b and 3c. They have a thickness which is approximately equal to half the thickness of the connecting rod. The seats 13 of each element 12 are installed facing one another; friction surfaces of the articulation 11 during installation of the connecting rod on the crank shaft pin are arranged perpendicular to the longitudinal axis 14 of the connecting rod bearing. The elements 12 of each of the parts 5 of the connecting rods are held together by a means of assembly.

In one application example, the assembly means can be two lugs provided on each of the elements made by forging. These lugs form a coupling and rotation pivot.

Thus, before installation of the two parts of the connecting rod by articulation 11, the two lugs are subjected to a bending constraint in the assembly unit that exerts pressure upon approach and contact of the joint surfaces 9 of the two parts 5 of the connecting rod. This constraint avoids or reduces a possible tendency toward separation of the two half-bearings 7, a tendency which could cause them to deform under the load applied to the half-bearings by the intermediary of the cylindrical surface of the piston shaft.

In another embodiment of the invention, the means of assembly is comprised of a shaft 15 that goes through the elements 12, perpendicular to the surfaces of the seats 13, to form an articulation shaft. The articulation shaft is selected from among a lynch pin, which can be immobilized by a small amount of matte finish in at least one of its ends, a bolt whose head and shaft could be fitted into the facings, or a thin pin held securely.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. A forged connecting rod comprising:
a body, a first end, and a second end which is larger than the first end, wherein first and second bearings are formed at the first and second ends, each of which can receive a piston shaft and a crank shaft pin, said connecting rod being comprised of first and second parts which are approximately symmetrical with respect to a longitudinal median plane of the connecting rod, which is substantially parallel to the axis of said bearings, a joint surface of the first and second parts being essentially arranged in the median plane, said first and second parts each carrying a half-bearing at the first end and a half-bearing at the second end, and said first and second parts being connected to one another by at least one immobilization means;

wherein said immobilization means is located outside of the connecting rod on a side of the first end of said connecting rod and outside of an axis of the piston shaft, said immobilization means comprising an articulation having elements which are identical on each of the first and second parts of the connecting rod, the elements extending beyond a plane defined by a joint surface and having a thickness approximately equal to half a thickness of the connecting rod, seats of the elements being installed opposite one another, and friction surfaces of the articulation being arranged perpendicular to a longitudinal axis of the connecting rod bearings, the elements of each of the two first and second parts being held together by an assembly means.

2. A connecting rod according to claim 1, wherein the assembly means is comprised of a shaft which goes through the elements, and is perpendicular to surfaces of the seats, to form an articulation shaft.

3. A connecting rod according to claim 2, wherein the articulation shaft is selected from among a lynch pin, a bolt, or a thin pin.

4. A forged connecting rod for an internal combustion engine, comprising:

a body which includes first and second parts that are approximately symmetrical with respect to a longitudinal median plane of the connecting rod which is substantially parallel to the axis of said bearings, said body including a first end and a second end which is larger than the first end; and immobilization means for connecting the first and second parts to each other, said immobilization means being positioned in a vicinity of the first end of the connecting rod, said immobilization means positioned outside of an axis of said shaft and comprising an articulation, said articulation including elements which are identical on each of said first and second parts.

* * * * *